US006587831B1

(12) United States Patent
O'Brien

(10) Patent No.: US 6,587,831 B1
(45) Date of Patent: Jul. 1, 2003

(54) SYSTEM AND METHOD FOR ONLINE SCHEDULING AND SHIFT MANAGEMENT

(75) Inventor: Kenneth O'Brien, New York, NY (US)

(73) Assignee: Workforce Logistics Inc., New York, NY (US)

( * ) Notice: Subject to any disclaimer, the term of this patent is extended or adjusted under 35 U.S.C. 154(b) by 0 days.

(21) Appl. No.: 09/422,386

(22) Filed: Oct. 21, 1999

(51) Int. Cl.[7] .............................................. G06F 17/60
(52) U.S. Cl. ............................................. 705/8; 705/10
(58) Field of Search ....................................... 705/8, 10

(56) References Cited

U.S. PATENT DOCUMENTS

| | | | |
|---|---|---|---|
| 4,802,094 A | | 1/1989 | Nakamura et al. |
| 4,845,625 A | * | 7/1989 | Stannard ........................ 705/5 |
| 5,325,292 A | | 6/1994 | Crockett |
| 5,351,195 A | | 9/1994 | Sherman |
| 5,433,223 A | * | 7/1995 | More-Ede et al. .......... 128/898 |
| 5,440,478 A | | 8/1995 | Fisher et al. |
| 5,495,417 A | | 2/1996 | Fuduka et al. |
| 5,712,985 A | * | 1/1998 | Lee et al. ....................... 705/7 |
| 5,911,134 A | * | 6/1999 | Castonguay et al. ............ 705/9 |
| 6,058,370 A | * | 5/2000 | Church et al. ................. 705/10 |
| 6,088,626 A | * | 7/2000 | Lilly et al. ................... 700/100 |
| 6,192,346 B1 | * | 2/2001 | Green ........................... 705/9 |

FOREIGN PATENT DOCUMENTS

| | | | | |
|---|---|---|---|---|
| WO | WO 96/42062 | * | 12/1996 | ........... G06F/17/60 |
| WO | WO 99/03248 | | 1/1999 | |

OTHER PUBLICATIONS

Gamache, Michel. "The Preferential Bidding System at Air Canada". Aug. 1998; Transportation Science; v 32 n3. pp 246–255.*

Asia Intelligence. "Dominant's Net–Ready Scheduler Software". 1998; Computimes Malaysia*

Asia Intelligence; "Dominant's Net–Ready Scheduler Software". 1998; *Computimes Malaysia* (1998) (Abstract) http://proquest.umi.com/pqdweb?TS=98415.

Gamache, Michel, et al., "The Preferential Bidding System at Air Canada[1]" *Transportation Science*, Vo. 32:3, pp. 246–255 (1998).

Presswire, "jeTech Data Systems Changes Names to eLabor.com" *Magazine Journal; Trade* (2000) Full Text Article, *Presswire Coventry*: (2000) (Abstract) http://proquest.umi.com/pqdweb?TS=98415.

Rubinstein, Ed, "Curtailing Labor Costs: Softwares Let Operators Optimize Scheduling" *Nation's Restaurant News* (1998) http://proquest.umi.com/pqdweb?TS=98415.

Thompson, Dave, "Aspect Communications: Aspect Launches eWorkface Management 2000 at Call Centre Expo; Enables More Efficient Human Resource Planning in Multi–Channel Customer Contact Centres", *Presswire Coventry* (2000).

Yves, Nobert, et al., "Freight Handling Personnel Scheduling at Air Cargo Terminals", *Transportation Science* vol. 32:3, p. 295 (1998) (Abstract) http://proquest.umi.com/pqdweb?TS=98415.

Robotics & Computer–Integrated Manufacturing, "Production Planning And Control–The Tool To Ensure Logistical Quality", Hans–Peter Wiendahl, vol. 10 No. 1/2, pp99–107, 1993 printed in Great Britain.

PCT–International Search Report.

* cited by examiner

Primary Examiner—Hyung-Sub Sough
Assistant Examiner—James A. Reagan
(74) Attorney, Agent, or Firm—Darby & Darby

(57) ABSTRACT

A method for centrally creating a schedule for a group of company employees who may be geographically dispersed. The system operates over a distributed network thereby providing communication among employees and other data sources. The scheduling system assigns the employees to shifts while accommodating numerous factors including staffing requirements, employee preferences, and optimal settings based on forecasting. Forecasts derived from information concerning factors outside the company constitute extrinsic influences on the schedule generated according to the invention.

18 Claims, 8 Drawing Sheets

FIG. 2B

SYSTEM AND METHOD FOR ONLINE SCHEDULING AND SHIFT MANAGEMENT

BACKGROUND OF THE INVENTION

Among known employee and workforce management systems used for scheduling and managing personnel are systems designed to support telephone call centers. Such systems typically include a basic planning capability to enable a manager to forecast future call loads and employee requirements to service such loads. Some of these systems provide a scheduling capability which allocates employee work hours according to forecasted staffing requirements. Employees are assigned to fill the schedules and employee assignments are posted.

Conventional forecasting techniques are computationally-efficient, accurate on a macro scale, e.g., month-to-month, and to a limited degree, able to accommodate real-time changes in call volumes over a more dynamic period, e.g., every half hour. However, such forecasting techniques have not accommodated data other than historic data of similar schedule sessions.

Known workforce management systems do not account for the many factors that can influence workload demands and forecasting. Among such factors are weather, traffic, and the stock market. As a result, the forecasting provided by such systems is subject to dramatic workforce shortage and over-supply in the event that an extrinsic event influences a region covered by the company using such a system. Further, workforce management systems in the prior art fail to effectively include dynamic employee preferences in the scheduling process and do not permit an employee to post a proposed change to his or her schedule.

What is needed in the art and has not been available is a scheduling system and method which dynamically incorporates extrinsic data. What is further needed in the art is a system and method which allow employees remote access to receive scheduling information and post proposed changes to the schedule. The present invention satisfies these and other needs.

SUMMARY OF THE INVENTION

The present invention provides a system and method for generating schedules at a central location based on information received from a number of distributed sources. The system and method assign the employees to shifts to fill a schedule template while complying with any business and employee constraints that have been specified. Among particular features, the schedules that are generated can accommodate employee preferences such as shift requests, leave requests and shift swapping. In a particularly preferred form, the present invention enables managers to conduct auctions to fill popular shifts and reverse auctions to fill unpopular shifts. The system also can forecast workloads and incorporate the forecast results into the schedule template to generate a more efficient schedule.

In accordance with one embodiment of the present invention, a method for centrally creating a schedule is described for use in connection with a distributed network of the type which includes a host server and at least one first client side machine. In this method, schedule requirements provided by the first client side machine through the distributed network are processed, for example, at the host server. A schedule is then constructed in accordance with the processed schedule requirements. A plurality of extrinsic sources provide further information to the host server through the distributed network. The schedule is revised in accordance with any further information that is received, and the revised schedule is made available to each of the first client side machines that are connected in the distributed network.

In further aspects of this first embodiment, an optimal shift pattern or optimal staffing requirement can be determined for the schedule. In a particularly preferred embodiment, the host server communicates with one or more second client side machines which can provide shift requests to the host server. Any such shift requests from the second client side machines can be accompanied by a bid which is used by the host server to select among multiple shift requests in an auction-like process.

In accordance with another embodiment of the invention, a method for centrally creating a schedule is disclosed for use in a distributed network of the type which includes a host server, a first client side machine, and a plurality of second client side machines. In this method, scheduled requirements are received from the first client side machine through the distributed network and are processed, for example, by the host server. In addition, schedule requirements are received from one or more of the plurality of second client side machines through the distributed network for processing, for example, by the host server. A schedule is constructed in accordance with the processed schedule requirements. The host server receives further information through the distributed network from one or more of the second client side machines and revises the schedule in accordance with any such further information. The revised schedule is then made accessible to the first client side machine as well as one or more of effecting client side machines.

These and other features, embodiments, and aspects the present invention can be appreciated from the following drawing description and detailed description of a preferred embodiment.

BRIEF DESCRIPTION OF THE DRAWINGS

FIG. 2B is an exemplary detailed schedule for a single day generated in accordance with the preferred embodiment;

DETAILED DESCRIPTION OF A PREFERRED EMBODIMENT

In a preferred embodiment, an online scheduling system in accordance with the present invention is adapted for scheduling and managing personnel at a telephone call center. Such an environment requires a varying number of employees to respond to a varying number of calls. However, the invention has utility in other applications; a telephone call center is only a preferred environment of the invention and is not limiting of the scope of the invention.

Figure 1:
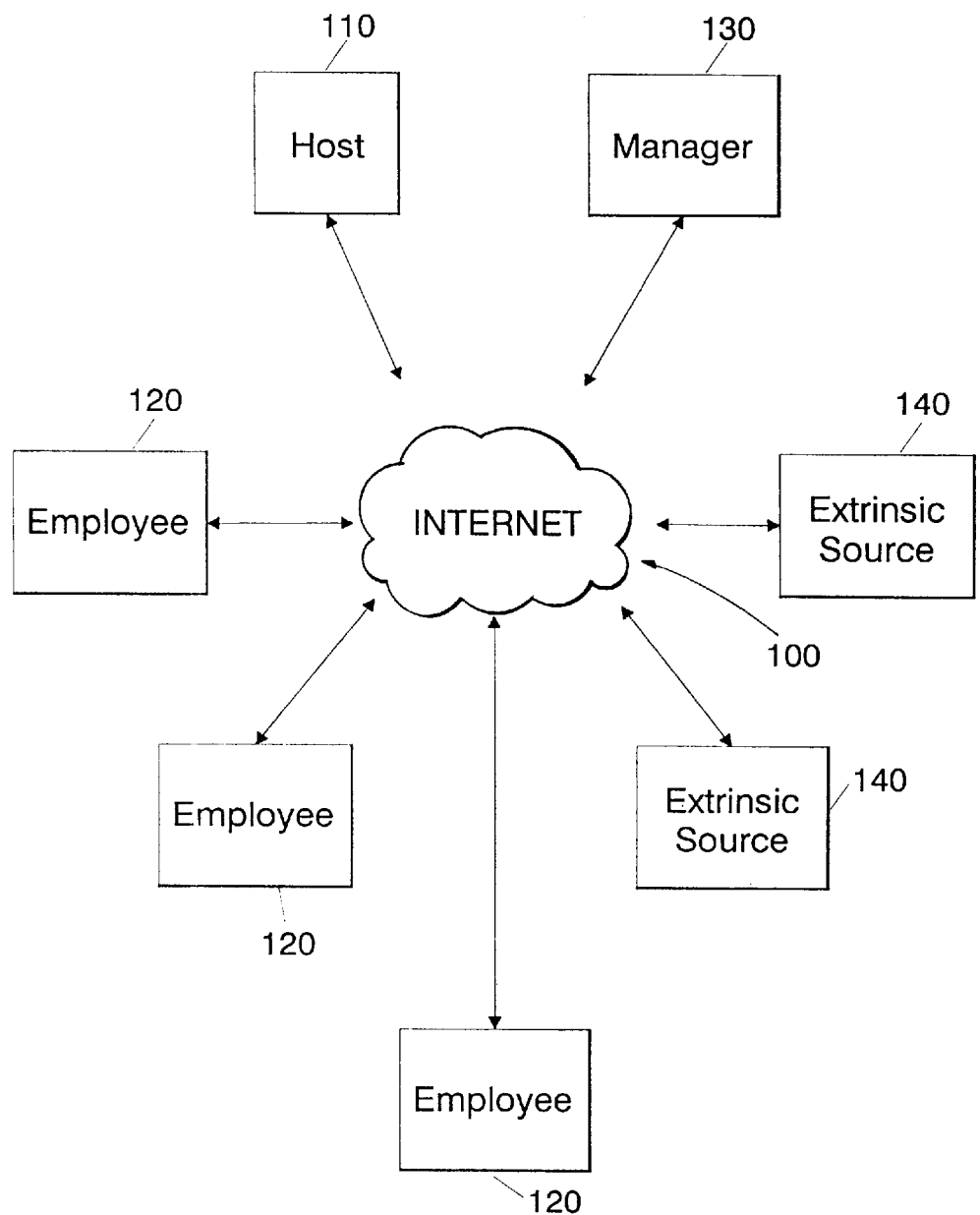
FIG. 1 is a schematic diagram of an arrangement for using the online scheduling system of the present invention.

As shown in FIG. 1, the online scheduling system of the present invention is accessed across a distributed network such as the Internet 100 and preferably operates from a host server 110. Communications between persons at one or more stations and to the system are by way of conventional telecommunications systems and links (illustrated as double-headed arrows). Managers and employees access the host using standard computers 120, 130 with standard connections to the Internet. The manager and employee can use the same machine (e.g., machine 120) to access the host 110 and are preferably distinguished by respective user identifications and permissions. Permission refers to a code that informs the host which functions are available to each user. For example, permissions can be set to restrict new employee enrollment to users identified to the host 110 as being managers. Permissions are preferably encoded in the user identification number to avoid maintaining a separate code.

The system and method in the preferred embodiment are maintained at the host server 110. The host server is a computer system which preferably has the capacity for high speed computing, large data storage, and efficient connection to a distributed network. The host server receives information from managers 130, employees 120 and extrinsic sources 140 and processes the information so as to maintain and update a schedule. The host server maintains records of all transactions including past workloads (e.g., telephone calls or sales volume), final schedules, requests, approvals and bids. The host server also monitors incoming data from extrinsic sources 140 such as the weather or news events. As described below, such extrinsic information can be used to forecast workload demand and propose and/or initiate any modification to the schedule.

For each company that uses the system, there is at least one designated manager and a several workers, employees, contractors or agents (more generally, "employees") associated with each manager. The manager has the ability to define a schedule which in turn sets forth the times, dates, and requirements for the shifts to be handled by the employees (and perhaps also the managers). The manager and the employees access the host through the Internet in a conventional manner. Each individual has a user identification number (user id) and a password. Associated with each user id is a set of permissions that define the features available to the user.

Figure 2:
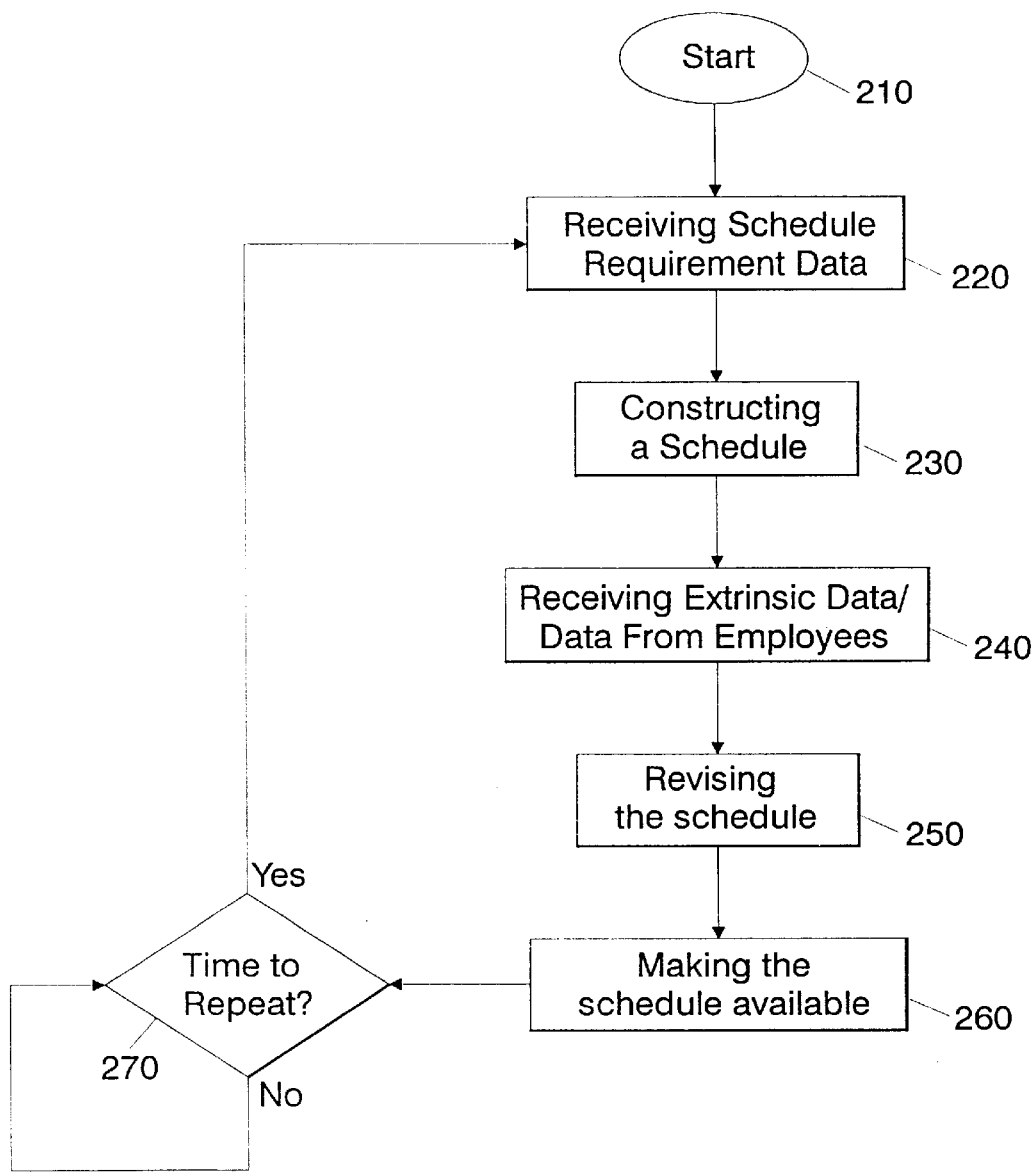
FIG. 2 is a flow chart showing a method in accordance with a preferred embodiment of the present invention.

A method in accordance with the preferred embodiment of the present invention is shown in FIG. 2. The method begins at step 210 with a first client-side machine 130 (the manager) logging onto the host 110. The location of the manager is not material to the invention. At step 220, the schedule requirement data are received at the host server 110 for processing by a processing unit. The schedule requirement data for generating a schedule include business parameters, employee data and a rule base, which are provided to the host 110 by the manager 130 and the employees 120. Each of these data is described below.

A. Business Parameters

Business parameters include positions, shift patterns, staffing requirements and schedule templates. Positions define the minimal hours per schedule, base hourly wage and overtime wage. Shift patterns define the start and end times, the maximum times an employee can work the same shift per schedule, and whether the shift may be overstaffed to fill minimal hours. Staffing requirements define the number or range of employees per position per shift. The schedule template defines the number of days in the schedule period, the start day, the range of shifts per day, and the maximum shifts per day. Each position, shift and schedule template has a unique identification number for organization and efficient cross-referencing.

B. Employee Data

Employee data includes basic employee information, his or her availability data, and request data. Basic employee information must be entered for each new employee, typically by a manager, and includes the employee's name, identification number, hire date, gender, date of birth, contact information, employee status (permanent or casual), minimal hours of work per schedule. The availability data defines when the employee is available for shift scheduling. The request data provides a basis for the host 110 to manage and process real-world influences on an employee's ability to attend his or her shift and enables an interaction among employees to resolve scheduling conflicts among themselves, as described in detail below.

Each employee has a password which can be used to access the host 10 to modify or input availability data and request data.

C. Rule Base

The rule base defines relationships between business data and employee data. The rule base includes constraints, among others, such as minimal hours between shifts, maximum consecutive shifts of the same type, maximum shifts before a day off, whether double shifts are allowed, whether overtime is allowed and whether permanent employees are preferred over casual employees. The rule base also includes weighted preferences for keeping days off together, days off on weekends, preferred shifts, and requested days off.

Referring again to FIG. 2, a schedule is constructed at step 230. The schedule includes a series of shifts to be worked for a given schedule period and the employee assignments for such shifts. A schedule period can be one week, one month, or some other period.

Figure 3:
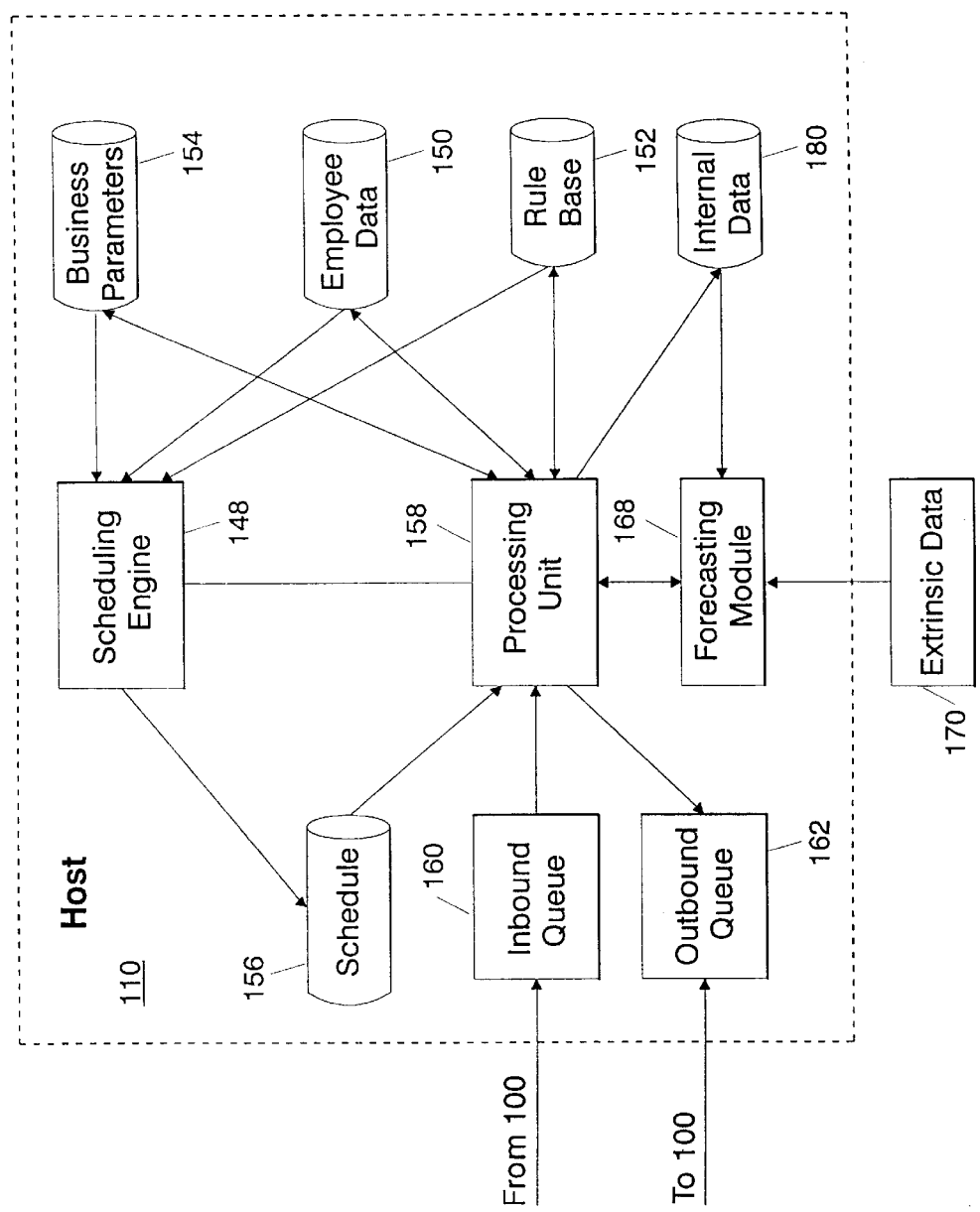
FIG. 3 is a schematic diagram of an arrangement within the host server in accordance with the preferred embodiment of the invention.

In generating the schedule, the host 110 prompts the manager for constraints and preferences that comprise the rule base described above, if not already known to the host. When the manager is satisfied with the rule base settings, the host saves the settings and initiates a scheduling engine 148 which is preferably based within the host 110, as shown in FIG. 3. The scheduling engine 148 retrieves the employee data 150 (shift requests, availability, etc.), the business parameters 154 and the rule base 152. The scheduling engine then generates an optimal schedule within the constraints of this retrieved data by assigning employees to each shift in the schedule template applying the business parameters and rule base to resolve any conflicts or make any selections from a range. The completed schedule is saved in a schedule data store 156. The scheduling engine 148 may also be initiated by the processing unit 158 in response to requests supplied by an inbound queue 160. The inbound queue 160 manages incoming requests over standard communication lines, including a communications link to the Internet 100. In either case, when the process is complete the schedule in the schedule data store 156 is available for viewing and notifications can be distributed automatically through an outbound queue 162 to preselected users (e.g., managers and/or employees). The processing unit 158 routes data from managers and employees to the appropriate database, initiates a response, when appropriate, and routes such response to the preselected managers and/or employees.

In accordance with a salient aspect of the preferred embodiment, the scheduling engine 148 processes information from extrinsic sources 170 at step 240. This process involves forecasting, described next in connection with FIG. 4.

Briefly, forecasting is a method for generating expected workloads for the purpose of optimizing work schedules. The expected workload is generated by examining patterns of workloads and determining what impact various factors have on the workload. The extrinsic factors that impact the workload varies with the type of business being scheduled, geographic region, the stock market, weather, and other factors of public concern. For example, a telephone call center for one company might experience a higher workload during days of poor weather conditions because more people might be inclined to stay indoors. Another company might experience a higher workload, for example, when the weather is good, during heavy traffic conditions or low interest rates. By correlating such extrinsic factors to workload requirements, the accuracy of the workload forecast is improved and schedules can be optimized.

Such forecasting is generated by a forecasting module 168 which can be responsive to two types of data: intrinsic and extrinsic data. Intrinsic data 180 used for forecasting is historical data from within the company that is gathered from past events and demands on the call center. For example, intrinsic data includes records of workloads and the final staffing assignments for each shift in a schedule period. In addition to incoming phone calls, workload records may include data from other departments within the company such as the sales department. The intrinsic data is used to determine patterns of high and low volume of work for various times of the day or day of the week or month. On the other hand, extrinsic data 170 comprises factors outside the company that influence the workload for a company's call center. The weather, traffic and stock market are examples of extrinsic data that can be made available to the host 110 through the Internet 100 or other data feed. Such extrinsic data is correlated with the intrinsic data to determine how the extrinsic forces influence the workload. The host 110 receives the extrinsic data from a data source or device 140 (FIG. 1) by way of an online data feed or from a periodic data feed.

Figure 4:
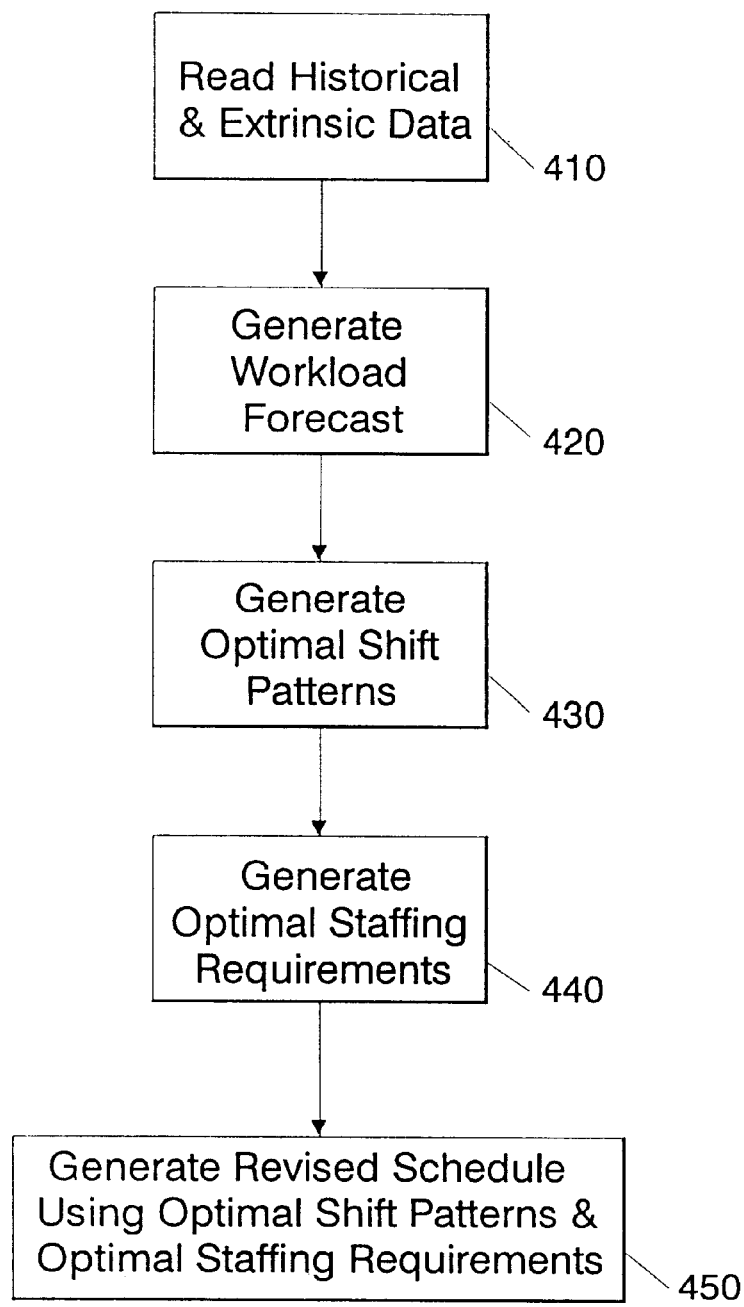
FIG. 4 is a flow chart showing a further feature of the embodiment of FIG. 2 in which demands on the schedule are forecasted.

Referring to FIG. 4, periodically or on command, the forecasting module 168 reads 410 and analyzes intrinsic and extrinsic data received from the extrinsic data source(s) 170 and the intrinsic data source 180. The forecasting module 168 generates a forecast 420 of the workload for a given schedule period. In particular, the forecast examines such data and determines for a given schedule period whether the current workforce is adequate across all shifts to meet forecasted demand, whether the current workforce is inadequate to meet forecasted demand, or whether the current workforce exceeds the forecasted demand. Based on the forecasted workload, the forecasting module generates optimal shift patterns 430 and optimal staffing requirements 440 which are tailored to meet and perhaps exceed the forecasted workload across all shifts in a given schedule period. Shift patterns include the start and end times of various shifts. Staffing requirements includes the number of employees required to work for each shift. The optimal shift patterns 430 and staffing requirements 440 are incorporated into the schedule requirements, and more particularly into the business parameters, and then processed by the processing unit 158 to generate a revised schedule 450. The revised schedule reflects the optimizations derived from the workload forecast based on the extrinsic data.

Referring again to FIG. 2, at step 250 the schedule is revised in accordance with the output from the forecasting module 168. The scheduling engine 148 changes select business parameters based on the workload that has been forecast. For example, shift start and end times may be changed to disperse an anticipated high volume of workload over more than one shift (shift patterns), or the number of employees-per-position-per-shift may be raised for anticipated peaks in the workload (staffing requirements). Once such information has been incorporated into the business parameters, the schedule engine 148 generates a revised schedule in the same manner as described above in connection with step 230.

Figure 2A:
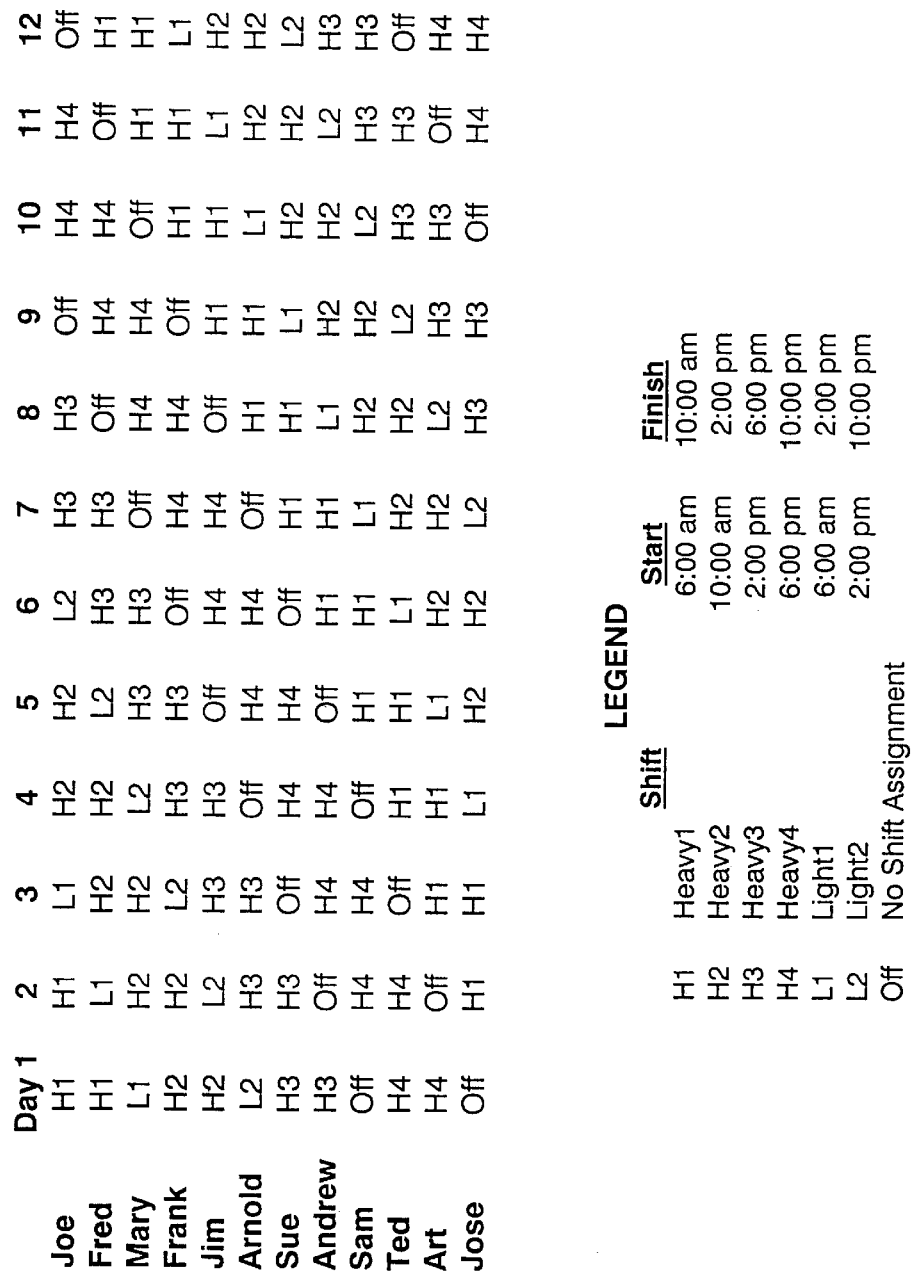
FIG. 2A is an exemplary schedule for a twelve day period generated in accordance with the preferred embodiment.
Figure 2B:
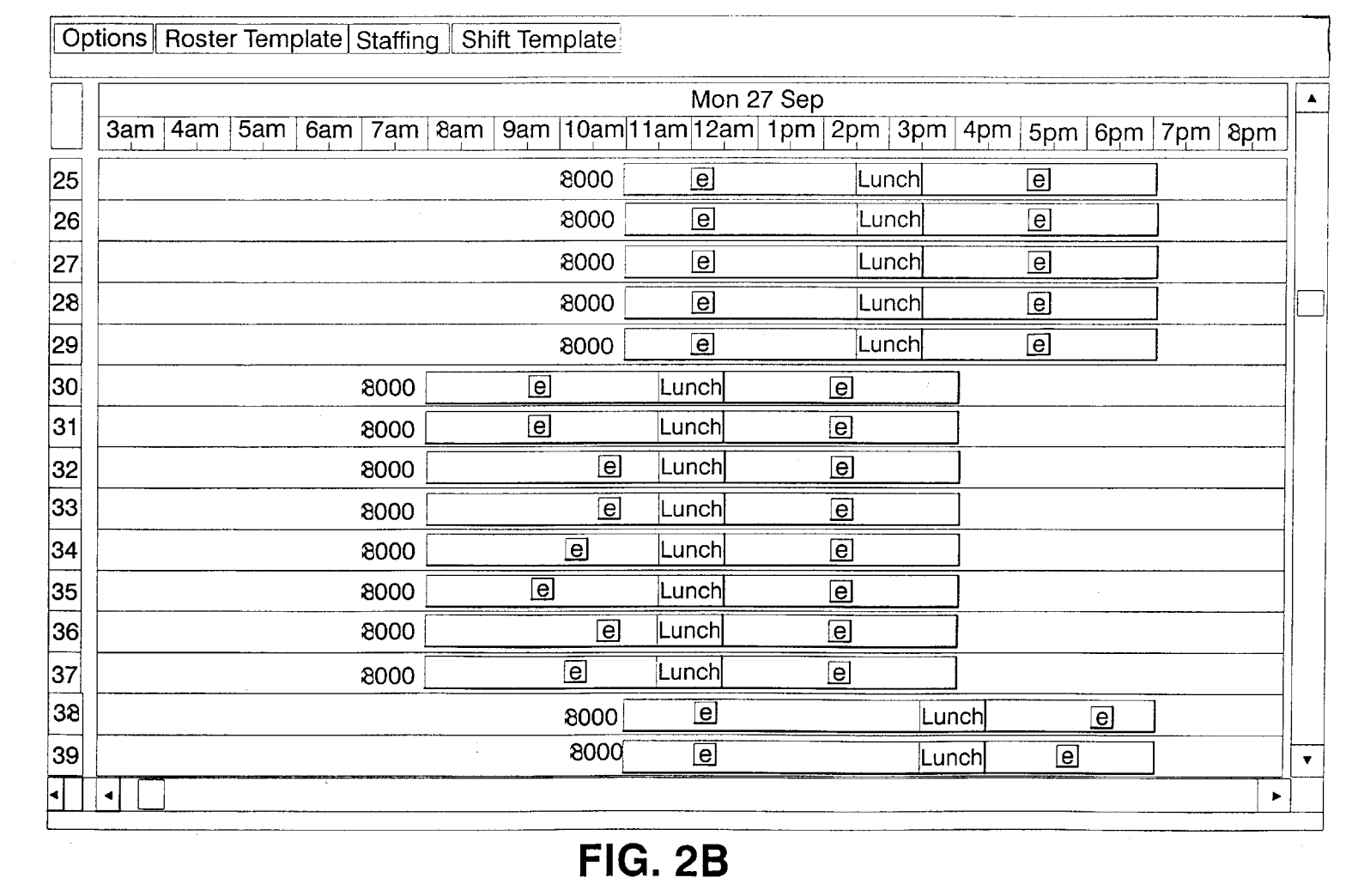

At step 260, the host makes the current schedule available to managers and employees. This can be done by an active "push" in which the schedule is automatically forwarded to designated recipients or by posting the data at the host server 110 for manual access by the manager and/or employees. When a manager or employee logs onto the host through the Internet, the host server displays a menu which permits the user to view the current schedule. When the current schedule is selected, the host displays a table for the schedule period in which the columns indicate the day, the rows indicate the employee, and the cells indicate the shift assignment for each employee each day. Such a schedule is shown in FIG. 2A. Alternatively, the host 110 displays a table of the schedule for the employees for a single day in which the table columns indicate the time of day, the rows indicate the employee and the cells indicate the working time and breaks for each employee. Such a schedule is shown in FIG. 2B. In particular, FIG. 2B shows that various employees are assigned to different shifts, some starting at 8:00 AM and others starting at 11:00 AM, and the employee breaks and lunch periods are staggered. In every schedule, there is always at least one employee on duty at all times during the hours of operation, note 12:00–12:15 PM, and in this sample schedule, the maximum number of employees are on duty during the peak hours for the company from 12:30 PM to 2:15 PM.

The manager reviewing the resulting schedule may determine that some of the business parameters or preferences in the rule base should be altered and the schedule should be regenerated. In any event, the processes of generating schedules is an ongoing process that is repeated (a) sporadically on command or (b) automatically on a periodic basis. Hence, the system operations are repeated when either prescribed repeat condition is satisfied, as indicated at step 270.

Figure 5:
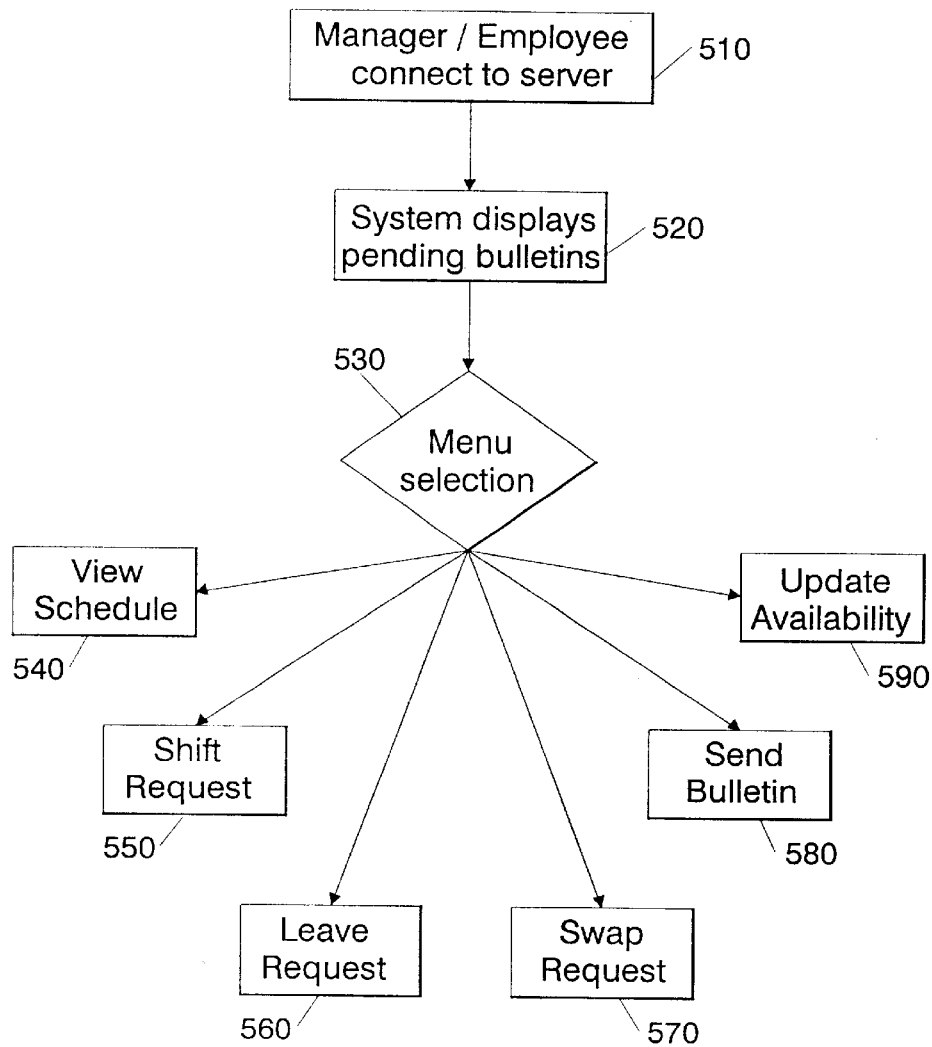
FIG. 5 is a detailed flow chart showing options presented to users of the embodiment of FIG. 2.

Other features contribute to the effective operation of the preferred embodiment. For example, to facilitate communication between the employees and the manager as well as appraise users of the latest information, the host maintains a bulletin system. With reference now to FIG. 5, when an employee or manager logs onto the host server at step 510, the host server displays all pending bulletins at step 520. Bulletins are messages from other employees, or the manager or generated by the host. Pending bulletins are new messages that were received or generated since the employee last communicated with the host server. Every bulletin includes a message, identifies the sender and identifies the recipient or recipient group if the user is an intended recipient for a bulletin or if the user is in the group of intended recipients, the bulletin is displayed at step 520. Some or all of the bulletins can be automatically pushed to the manager or employee by e-mail, instant messaging or other electronic means.

From the viewpoint of the employee using the system, there are a number of features that the employee can use to participate in scheduling. An employee has several options made available for selection from a menu 530. The employee can view a schedule 540, enter shift request 550, enter a leave request 560, enter a swap request 570, send a bulletin 580, or update his or her availability 590. Each of these features is described in more detail below.

An employee can view the schedule for a schedule period by selecting the option to view schedule 540. The host prompts the employee to specify the schedule period desired. The host then retrieves the specified schedule from the schedule data store 156 and displays it at the employee's station 120. The display is described above at 260.

Figure 6:
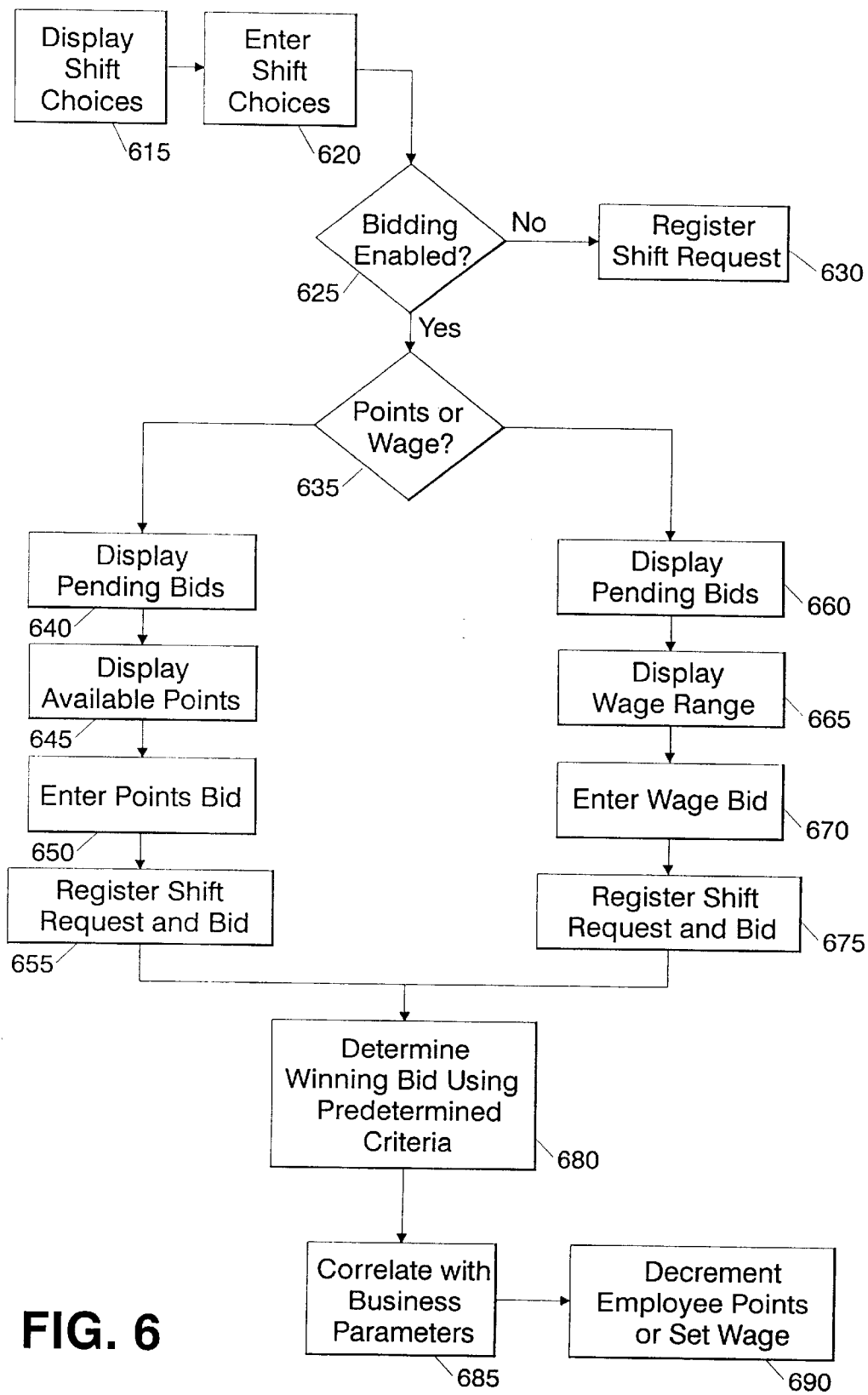
FIG. 6 is a flow chart showing another feature of the embodiment of FIG. 2 in which worker/employee requests are processed.

The shift request 550 feature is used to accommodate employee preferences and is shown in more detail in FIG. 6. Employees can submit a request for a particular shift assignment or for a change of a shift assignment. By selecting the shift request option 550 from the menu, the host displays a list of shifts defined for that employee (step 615). The host prompts the employee to enter a shift selection at step 620. Any shift request by the employee entered at step 620 is registered in the processing unit 158 of the host server at step 630. The processing unit 158 verifies that the shift request is valid and appropriate for the employee, for example, verifies that the employee has permission to work that shift. When the scheduling engine 148 generates a new schedule, or revises a schedule, it attempts to accommodate the shift request from step 620. After generating a schedule, the processing unit 158 distributes bulletins to those effected by the schedule through the outbound queue 162. In this way, the employee is automatically notified of whether his or her shift request was accommodated or not and the manager can also be notified if desired. In addition, the employee can view the schedule by a selection from the menu at step 530.

The system also allows the manager to take an active role in the shift request process. After the employee enters a shift request the manager can be automatically notified of pending shift requests or can review them by accessing the host server 110. The manager can scroll through any entered shift requests and mark each one as preliminarily approved or declined. A status flag indicates to the scheduling engine 148 each such preliminary approval or denial. The scheduling engine seeks to generate a schedule which accommodates the shift requests that were flagged as preliminary approved. The processing unit 158 notifies each employee whether his/her request was declined, and notifies the requester of each preliminary approved shift request whether such request can be accommodated in the schedule.

The preferred embodiment also offers the option of enabling bidding for particular shifts. At step 625, a test is made to see if bidding is enabled. If it is not, the process flow proceeds as described above. Otherwise, a determination is made at step 635 whether points-or wage-based bidding is to be used.

If the bidding process is employee enabled, the host 110 informs the employee that the shift request is being auctioned at step 625. If other employees have requested a shift change, the host will display such pending bids at step 640. The points available to the particular employee in question are also displayed at step 645. The employee enters a bid at step 650 to accompany the shift request and each bid is stored along with the shift request (655) in the inbound queue 160 for processing at the host server 110. The bidding period may be defined by the manager or remain open until the next schedule is generated. When the bidding period is over, an end-auction flag is set. The host proceeds to determine the outcome of the auction based on a predetermined point bidding criteria at step 680. The criteria can be, for example, the highest valid bid. The outcome of the auction is not reflected in a schedule until the schedule is generated to avoid conflicts with higher priority business parameters and the rule base. Thus, the bid is correlated with the business parameters at step 685. If the employee's bid satisfies the predetermined criteria and fits the business parameters, he or she will receive the shift assignment, and his/her point tally will be decreased by the points bid. As with each schedule that is generated, the effected employees and/or managers are notified of the schedule and the outcome of their requests.

In accordance with a particularly preferred arrangement, reverse bidding can be enabled for particular shifts by manager discretion. In accordance with this aspect of the invention, reverse bidding has employees bidding for a job, with the lowest wage going to the successful applicant. The manager enables such reverse bidding by specifying select shifts for particular positions and setting the maximum wage for each. When the employee enters a shift request date and shift for which wage bidding was enabled step 635, the host will display any pending bids at step 660 as well as the range for such bids at step 665. The range includes the normal wage and maximum wage for the specified shift request. The employee enters his or her wage bid at step 670 and such bid is stored along with the shift request 675. The host proceeds in a similar manner as point bidding (described above in connection with steps 640–655), except that the wage bidding criteria is different from the point bidding criteria. Preferably, the wage bidding criteria is the lowest wage. A winning bid is determined at step 680, such bid is correlated with the business parameters at step 185, and the employees' wage level is set at step 690, as described above.

Another feature that is used to accommodate employee preferences is the leave request 560. When an employee needs a day off, the employee can request a leave for a particular day by selecting leave option from the menu. After selecting the leave option, the host 110 prompts the employee for the day and reason for the requested day off. The host verifies that the leave request is appropriate for that employee and register the request. If manager approval is required, the host notifies the manager and the manager sets a status flag that indicated approved or denied. The host attempts to accommodate the leave request (if approved) the next time that the scheduling engine 148 is generating or revising the schedule. Thereafter, the host server 110 notifies the employee of the result of the leave request through the Internet 100.

Another way in which the system can accommodate employee preferences is shift swapping 570. An employee may enter a request to swap shifts with another employee. The other employee enters a corresponding swap request. When the host encounters a swap request while generating the schedule, it confirms that there is a corresponding swap request before revising the schedule. In addition the host verifies that the effect of the swap is consistent with the scheduling requirements. When the scheduling engine 148 is next initiated, a revised schedule can be readily generated reflecting the swap request. Both employees receive notices of the swap and all employees can view the revised schedule. The host can be set to include the manager in shift swapping requests. In this instance, the manager receives notice of the swap request once it has been confirmed and verified. The manager may approve or deny the request and the host proceeds accordingly. Optionally, the employees can be awarded points for facilitating the shift swap and alleviating the manager from having to fill the shift.

As described above, the host maintains a bulletin system. When an employee wants to swap shifts the employee may chose to utilize the bulletin system to find an employee with whom to swap. In this case, the employee selects the menu option to send a bulletin at step 580. The host prompts the employee to enter a message and to enter the recipient or group of recipients. For example, the sender may want to send the message only to other employees who hold the same position as the sender. When the information is entered, the host stores it and marks the appropriate registers so that it will display the message for each of the recipients respectively when each one logs onto the host.

Update availability, step 590, is a feature that enables the employees to maintain personal data directly on the host. For example, if an employee previously was only available to work on weekdays, but the employee is now available for weekends as well, the employee could enter this change using update availability. By selecting the update availability the host displays the current information and the employee may enter the changes. The host stores the changes and notifies the manager of the changes. The information will be reflected in the next schedule generated.

The invention has been described in connection with a particular embodiment but is defined without limitation by the appended claims and includes insubstantial variations in elements and method steps.

What is claimed is:

1. In a distributed network of the type including a host server, a first client-side machine, and a second client-side machine, a method for centrally creating a schedule which accommodates an extrinsic influence comprising the steps of:
   (a) processing schedule requirements provided from the first-client side machine through the distributed network;
   (b) constructing the schedule in accordance with the processed schedule requirements;
   (c) processing further information at the host server received through the distributed network from at least one of a plurality of extrinsic sources;
   (d) revising the constructed schedule in accordance with the further information received;
   (e) making the revised schedule accessible to the first-client side machine;
   (f) receiving a shift request from the second client-side machine through the distributed network;
   (g) verifying the received shift request using the schedule requirements;
   (h) receiving a point bid together with the shift request from the second client-side machine;
   (i) verifying the received point bid using a predetermined point bidding criteria;
   (j) storing the verified point bid and the shift request at the host server;
   (k) receiving an end-auction flag from the first client-side machine through the distributed network;
   (l) upon receipt of the end-auction flag, revising the schedule on the condition that the shift request is approved; and
   (m) sending a response to the second client-side machine in response to the point bid.

2. In a distributed network of the type including a host server, a first client-side machine, and a second client-side machine, a method for centrally creating a schedule which accommodates an extrinsic influence comprising the steps of:
   (a) processing schedule requirements provided from the first-client side machine through the distributed network;
   (b) constructing the schedule in accordance with the processed schedule requirements;
   (c) processing further information at the host server received through the distributed network from at least one of a plurality of extrinsic sources;
   (d) revising the constructed schedule in accordance with the further information received;
   (e) making the revised schedule accessible to the first-client side machine;
   (f) receiving a shift request from the second client-side machine through the distributed network;
   (g) verifying the received shift request using the schedule requirements;
   (h) receiving a wage bid together with the shift request from the second client-side machine;
   (i) verifying the received wage bid using a predetermined wage bidding criteria;
   (j) storing the verified wage bid and the shift request at the host server;
   (k) receiving an end-auction flag from the first client-side machine through the distributed network;
   (l) upon receipt of the end-auction flag, revising the schedule on the condition that the shift request is approved; and
   (m) sending a response to the second client-side machine in response to the wage bid.

3. In a distributed network of the type including a host server, a first client-side machine and a second client-side machine, a method for centrally creating a schedule which accommodates an extrinsic influence comprising the steps of:
   (a) processing schedule requirements provided from the first-client side machine through the distributed network;
   (b) constructing the schedule in accordance with the processed schedule requirements;
   (c) processing further information at the host server received through the distributed network from at least one of a plurality of extrinsic sources;
   (d) revising the constructed schedule in accordance with the further information received;
   (e) receiving a swap-shift request from the second client-side machine through the distributed network;
   (f) confirming the existence of a corresponding swap-shift request in a database;
   (g) verifying that the confirmed swap-shift request fits the schedule requirements of the schedule;
   (h) revising the schedule in accordance with the verified swap-shift request;
   (i) sending a response to the second-client side machine; and
   (j) making the revised schedule accessible to the first client-side machine.

4. In a distributed network of the type including a host server, a first client-side machine and a plurality of second client-side machines, a method for centrally creating a schedule comprising the steps of:
   (a) receiving schedule requirements from the first client-side machine, the schedule requirements including business parameters and employee data;

(b) creating a rule base defining relationships between the business parameters and the employee data;
(c) processing schedule requirements received from one or more of the plurality of second-client side machines through the distributed network;
(d) constructing the schedule by applying a schedule template to the employee data in accordance with the business parameters, rule base and the processed schedule requirements;
(e) processing further information at the host server received through the distributed network from one or more of the second client-side machines;
(f) revising the constructed schedule in accordance with the further information;
(g) making the revised schedule accessible to the first-client side machine and one or more of the second client-side machines;
(h) receiving a shift request from a specific second client-side machine through the distributed network;
(i) verifying the received shift request using the schedule requirements;
(j) sending the verified shift request to the first client side machine through the distributed network;
(k) awaiting receipt of a status flag from the first client side machine through the distributed network;
(l) upon receipt of the status flag, revising the schedule on the condition that the verified shift request is approved; and
(m) sending a response to the specific second client-side machine through the distributed network in response to the shift request.

5. In a distributed network of the type including a host server, a first client-side machine and a plurality of second client-side machines, a method for centrally creating a schedule comprising the steps of:
(a) receiving schedule requirements from the first client-side machine, the schedule requirements including business parameters and employee data;
(b) creating a rule base defining relationships between the business parameters and the employee data;
(c) processing schedule requirements received from one or more of the plurality of second-client side machines through the distributed network;
(d) constructing the schedule by applying a schedule template to the employee data in accordance with the business parameters, rule base and the processed schedule requirements;
(e) processing further information at the host server received through the distributed network from one or more of the second client-side machines;
(f) revising the constructed schedule in accordance with the further information;
(g) making the revised schedule accessible to the first-client side machine and one or more of the second client-side machines;
(h) receiving a shift request from a specific second client-side machine through the distributed network;
(i) verifying the received shift request using the schedule requirements;
(j) receiving a point bid together with the shift request from one of the second client side machines;
(k) verifying the received point bid using a predetermined point bidding criteria;
(l) storing the verified point bid and the shift request at the host server;
(m) receiving an end auction flag from the first client side machine through the distributed network;
(n) upon receipt of the end auction flag, revising the schedule on the condition that the shift request is approved; and
(o) sending a response to the one second client side machine in response to the point bid.

6. In a distributed network of the type including a host server, a first client-side machine and a plurality of second client-side machines, a method for centrally creating a schedule comprising the steps of:
(a) receiving schedule requirements from the first client-side machine, the schedule requirements including business parameters and employee data;
(b) creating a rule base defining relationships between the business parameters and the employee data;
(c) processing schedule requirements received from one or more of the plurality of second-client side machines through the distributed network;
(d) constructing the schedule by applying a schedule template to the employee data in accordance with the business parameters, rule base and the processed schedule requirements;
(e) processing further information at the host server received through the distributed network from one or more of the second client-side machines;
(f) revising the constructed schedule in accordance with the further information;
(g) making the revised schedule accessible to the first-client side machine and one or more of the second client-side machines;
(h) receiving a shift request from a specific second client-side machine through the distributed network;
(i) verifying the received shift request using the schedule requirements;
(j) receiving a wage bid together with the shift request from one of the second client side machines;
(k) verifying the received wage bid using a predetermined wage bidding criteria;
(l) storing the verified wage bid and the shift request at the host server;
(m) receiving an end auction flag from the first client side machine through the distributed network;
(n) upon receipt of the end auction flag, revising the schedule on the condition that the shift request is approved; and
(o) sending a response to the one second client side machine in response to the wage bid.

7. In a distributed network of the type including a host server, a first client-side machine and a plurality of second client-side machines, a method for centrally creating a schedule comprising the steps of:
(a) receiving schedule requirements from the first client-side machine, the schedule requirements including business parameters and employee data;
(b) creating a rule base defining relationships between the business parameters and the employee data;
(c) processing schedule requirements received from one or more of the plurality of second-client side machines through the distributed network;
(d) constructing the schedule by applying a schedule template to the employee data in accordance with the business parameters, rule base and the processed schedule requirements;
(e) processing further information at the host server received through the distributed network from one or more of the second client-side machines;
(f) revising the constructed schedule in accordance with the further information;

(g) making the revised schedule accessible to the first-client side machine and one or more of the second client-side machines;

(h) receiving a shift request from a specific second client-side machine through the distributed network;

(i) verifying the received shift request using the schedule requirements;

(j) receiving a swap shift request from one of the second client side machines through the distributed network;

(k) confirming the existence of a corresponding swap shift request in a database;

(l) verifying that the confirmed swap shift request fits the schedule requirements of the schedule;

(m) revising the schedule in accordance with the verified swap shift request; and (n) sending a response to the one second client side machine through the distributed network in response to the swap shift request.

8. In a distributed network of the type including a host server, a first client-side machine and a second client-side machine, a method for centrally creating a schedule which accommodates an extrinsic influence comprising the steps of:

(a) processing schedule requirements provided from the first-client side machine through the distributed network;

(b) constructing the schedule in accordance with the processed schedule requirements;

(c) processing further information at the host server received through the distributed network from at least one of a plurality of extrinsic sources;

(d) revising the constructed schedule in accordance with the further information received;

(e) receiving a shift request from the second client-side machine through the distributed network;

(f) verifying the received shift request using the schedule requirements;

(g) sending the verified shift request to the first-client side machine through the distributed network;

(h) receiving from the first client-side machine a status-flag pertaining to the verified shift request;

(i) revising the schedule in accordance with the verified shift request on the condition that the received status-flag indicates approval;

(j) making the revised schedule accessible to the first-client side machine; and (k) making the revised schedule accessible to the second client-side machine in accordance with predetermined permissions.

9. The method as in claim 7, including the steps of:

receiving the information from at least one of the extrinsic sources at intervals through the distributed network;

processing said information to generate optimal shift patterns; and updating the schedule requirements to reflect the optimal shift patterns.

10. The method as in claim 9, wherein said information includes weather conditions.

11. The method as in claim 9, including the steps of:

receiving the information from at least one of the extrinsic sources at intervals through the distributed network;

processing said information to generate optimal staffing requirements; and updating the schedule requirements to reflect the optimal staffing requirements.

12. The method as in claim 1, including the additional steps of:

receiving schedule requirements from the first client-side machine, the schedule requirements including business parameters and employee data; and creating a rule base defining relationships between the business parameters and the employee data.

13. The method as in claim 7, wherein the step of constructing the schedule comprises:

applying a schedule template to the employee data in accordance with the business parameters and rule base.

14. The method as in claim 7, wherein the data conveyed from the host server to the second client-side machine is done in one of real-time and batch-processing mode.

15. In a distributed network of the type including a host server, a first client-side machine and a second client-side machine, a method for centrally creating a schedule comprising the steps of:

(a) processing schedule requirements provided from the first-client side machine through the distributed network;

(b) constructing the schedule in accordance with the processed schedule requirements;

(c) receiving a shift request from the second client-side machine through the distributed network;

(d) verifying the received shift request using the schedule requirements;

(e) sending the verified shift request to the first-client side machine through the distributed network;

(f) receiving from the first client-side machine a status-flag pertaining to the verified shift request; and (g) revising the schedule in accordance with the verified shift request on the condition that the received status-flag indicates approval.

16. The method of claim 15, further comprising the steps of:

making the revised schedule accessible to the first-client side machine; and making the revised schedule accessible to the second client-side machine in accordance with predetermined permissions.

17. The method of claim 16 further comprising the steps of:

processing further information at the host server received through the distributed network from at least one extrinsic source; and revising the constructed schedule in accordance with the further information received.

18. The method of claim 16 further comprising the step of selection at least one of weather information source, traffic information source, stock market information source as the at least one extrinsic source.

* * * * *